June 21, 1949.                    P. ZAKEL                    2,473,774
            LOAD EJECTING MECHANISM FOR CARRYING SCRAPERS
Original Filed July 10, 1945                              2 Sheets-Sheet 1
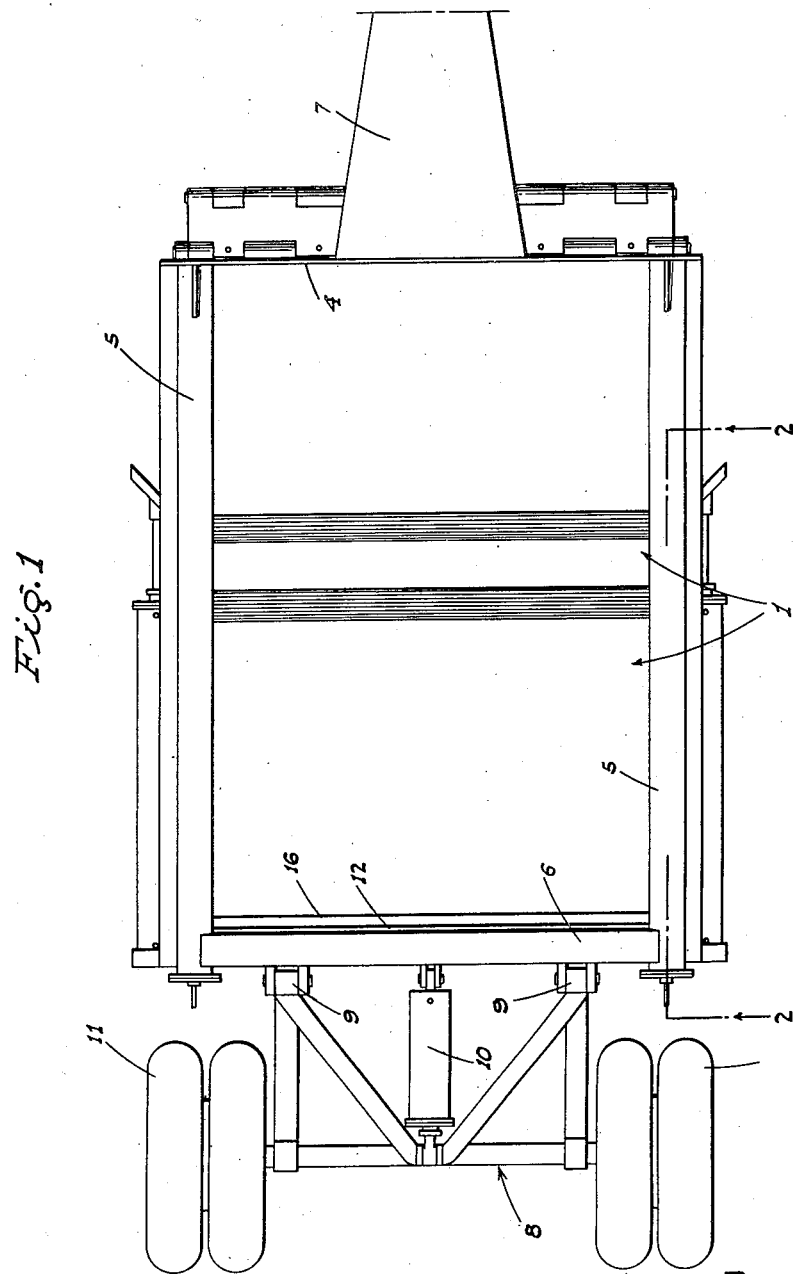
INVENTOR
*Paul Zakel*
BY *Webster & Webster*
ATTORNEYS

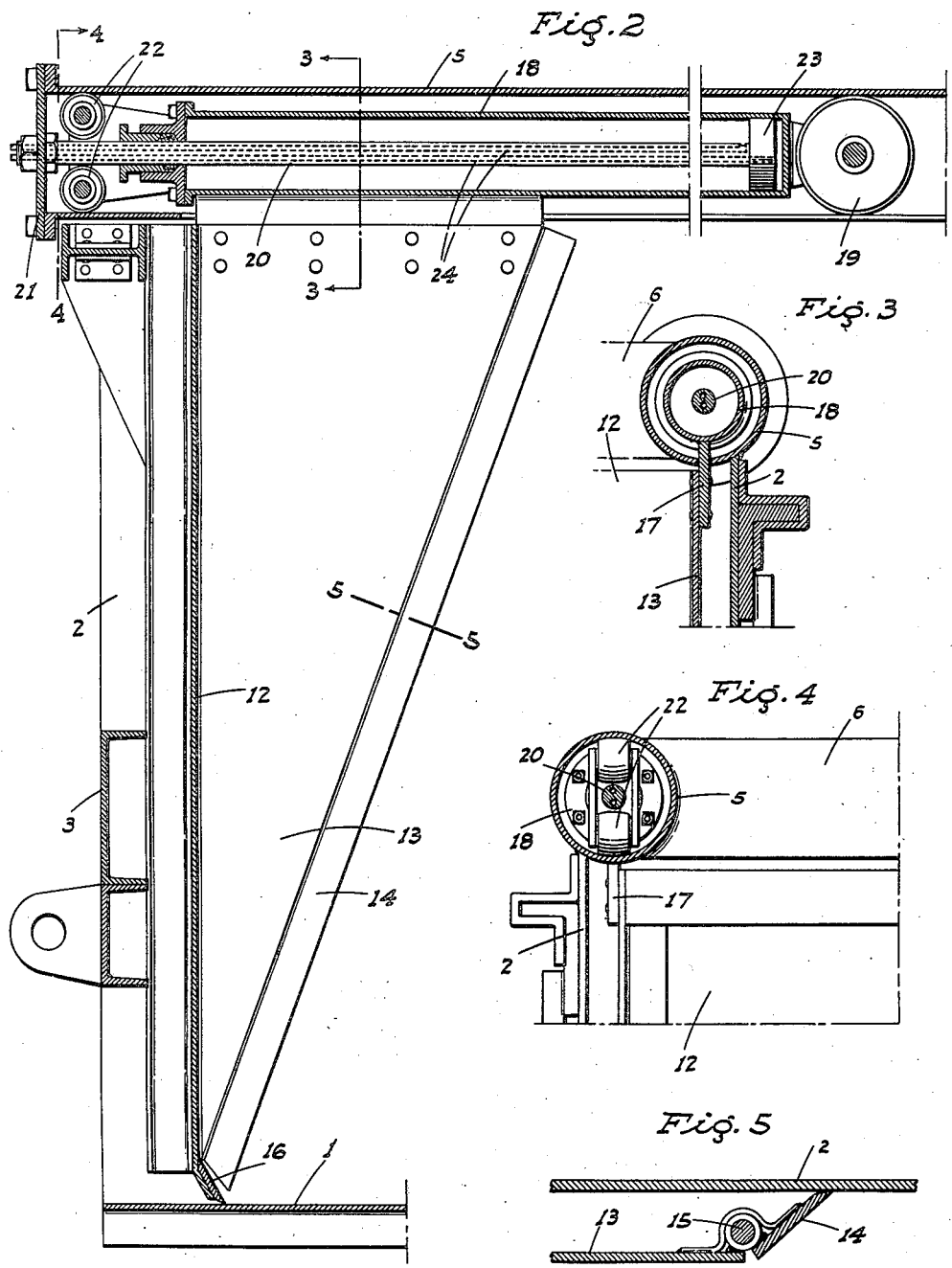

Patented June 21, 1949

2,473,774

UNITED STATES PATENT OFFICE 2,473,774

LOAD EJECTING MECHANISM FOR CARRYING SCRAPERS

Paul Zakel, Stockton, Calif.

Original application July 10, 1945, Serial No. 604,211. Divided and this application June 28, 1947, Serial No. 757,878

5 Claims. (Cl. 37—126)

1

This invention relates in general to earth working machines, and in particular the invention embraces improvements in carrying scrapers, especially of the type shown in J. S. Walsh U. S. Patent No. 2,179,532, dated November 14, 1939.

The object of the present invention is to provide an improved mounting and power actuating assembly for the rear endgate or load ejector of the scraper; and the provision on the endgate of bowl scraping blades mounted in a novel manner.

This application is a division of the application filed July 10, 1945, Serial No. 604,211, now Patent No. 2,425,664, granted August 12, 1947.

A further object of the invention is to produce a carrying scraper which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a plan view of the scraper.

Figure 2 is an enlarged, fragmentary sectional elevation of the rear endgate mounting and power actuating assembly taken on a line 2—2 of Fig. 1.

Figure 3 is a fragmentary cross section on line 3—3 of Fig. 2.

Figure 4 is a fragmentary cross section on line 4—4 of Fig. 2.

Figure 5 is a fragmentary plan on line 5—5 of Fig. 2.

Referring now more particularly to the characters of reference on the drawings, the scraper comprises a box-like bowl, indicated generally at 1, and which bowl includes elongated but rectangular side plates 2 connected at the back by means including cross beams 3. At the front the side plates are connected by a cross plate 4 extending about half way down from the top. Heavy-duty tubular top beams 5 are fixed in connection with and extend full length of the upper edges of the side plates 2, said tubular top beams being connected at the rear of the bowl by a cross beam 6.

At the forward end, adjacent the top and centrally thereof, the bowl 1 is fixed in connection with a forwardly projecting, rigid draft neck 7. At its forward end the draft neck 7 is adapted to be coupled to the rear end of a tractor in any desired manner.

At its rear end the bowl 1 is provided with a rearwardly extending, vertically swingable frame 8, pivotally connected at transverse points, as at 9, to the rear end of said bowl; the frame 8 being vertically swingable about said pivots by means

2 of a fluid-pressure actuated power cylinder 10 connected between the upper end of said frame and the cross beam 6 centrally of the ends thereof. At transversely spaced points the frame 8 is provided with ground engaging wheels 11 positioned so that when the frame 8 is swung in one direction or the other, it causes raising or lowering, respectively, of the bowl 1 at the rear end. The rear wheels 11, as well as the wheels of the tractor, have a tread no greater than the width of the bowl 1.

The scraper includes, in the bowl 1, a longitudinally movable, rear endgate or load ejector 12 which includes forwardly projecting vertical side flanges 13 running in adjacent but spaced relation to the sides 2 of the bowl. The forward edges of the side flanges 13 are initially separate and are formed as upstanding scraping blades 14 hinged to the side flanges 13, as at 15. See Fig. 5. The scraping blades 14 diverge forwardly and outwardly and run in scraping engagement with the inner surfaces of the sides 2. At its lower edge the endgate 12 includes a transverse scraping blade 16 which runs on the bottom plate of the bowl 1.

The endgate 12 is suspended in the bowl and power actuated for longitudinal movement in said bowl, as follows:

At their upper edges the side flanges 13 are extended upwardly, as at 17, and project through longitudinally extending slots in the bottom of the tubular top beams 5. Within said tubular top beams the flange extensions 17 are fixed in connection with fluid pressure actuated power cylinders 18 disposed in said beams in clearance relation thereto. The cylinders 18 are each fitted, at the forward end, with a roller 19 which rides within the corresponding tubular top beam in engagement top and bottom therewith. The power cylinders 18 each include a rearwardly projecting piston rod 20 which extends through a packing in the rear end of the cylinder and is thence fixedly connected through the end plate 21 of the corresponding top beam. At the rear end each cylinder 18 includes a roller assembly 22 riding the tubular top beam top and bottom. By reason of the above arrangement each piston rod 20 is stationary, and the jacket of the power cylinder 18 travels in a corresponding direction upon introduction of fluid pressure into the power cylinder on one side or the other of the piston 23.

Fluid pressure is introduced into each power cylinder 18 through a pair of passages 24 extending through the piston rod from its rear end, one passage opening on one side of the piston, while the other passage opens on the other side of the piston. By reason of this arrangement fluid pressure for the control of the cylinders 18 may be introduced thereinto by non-movable conduits (not shown) connected to the rear ends of the piston rods 20. When fluid pressure is introduced into the cylinders 18 ahead of the piston 23, the cylinder jackets, together with the rear endgate 12, advance along the bowl, while introduction of pressure onto the other or rear side of the piston causes endgate retraction. Thus, the endgate may be positively and forcefully moved in either an advancing or retracting direction; the powered advance of the endgate assuring of an even and positive ejection of the load from the bowl.

No detailed explanation of the cycle of operations of the scraper is set forth in this specification, as such cycle is substantially the same as in the above identified issued patent.

The power cylinders 10 and 18 are controlled through the medium of a fluid pressure supply system (not shown), but which includes operator-controlled valves adjacent the operator's station on the tractor, and conduits leading rearwardly to the implement; all of which is conventional in connection with the fluid pressure actuated devices on trailing types of earth working equipment.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent is desired:

1. In a carrying scraper which includes a bowl having a rear endgate movable therein, and mechanism mounting and power actuating the rear endgate, said mechanism including fluid pressure actuated power cylinders disposed lengthwise of the bowl on opposite sides thereof, said cylinders including jackets and projecting piston rods, means anchoring the piston rods relative to the bowl, means supporting the jackets for lengthwise movement relative to the bowl and in substantially constant parallelism with the longitudinal axis of the bowl, and means suspending the rear endgate from said cylinder jackets.

2. In a carrying scraper which includes a bowl having a rear endgate movable therein, and mechanism mounting and power actuating the rear endgate, said mechanism including fluid pressure actuated power cylinders disposed lengthwise of the bowl on opposite sides thereof, said cylinders including jackets and projecting piston rods, means anchoring the piston rods relative to the bowl, means supporting the jackets for lengthwise movement relative to the bowl, and means suspending the rear endgate from said cylinder jackets; the bowl including tubular beams extending along the sides thereof and the cylinders being disposed therein, said jacket supporting means cooperating with the inside of said beams, the bottom of the beams being longitudinally slotted and said suspending means projecting through the slots.

3. A scraper having rear endgate mounting and actuating mechanism as in claim 2, in which the piston rods each include a pair of separate fluid passages therethrough; said passages opening into the cylinders on opposite sides of the piston.

4. In a carrying scraper which includes a bowl having a rear endgate movable therein, and mechanism mounting and power actuating the rear endgate; said mechanism including elongated, tubular beams on opposite sides of the bowl, a power cylinder disposed in each beam and including a jacket and a projecting piston rod, means supporting the jackets for guided longitudinal movement in the beams, means anchoring the piston rods relative to said beams, means to feed fluid pressure selectively to opposite sides of the pistons in said cylinders regardless of the position of said jackets, the beams being slotted lengthwise on the bottom, and suspension members connected between the jackets and corresponding end portions of the endgate.

5. In a carrying scraper which includes a bowl having a rear endgate movable therein, and mechanism mounting and power actuating the rear endgate; said endgate including forwardly projecting side flanges at the ends spaced from the sides of the bowl, the leading edge portions of said side flanges being initially separate, and means hinging the side flanges and said edge portions together whereby the latter can ride the sides of the bowl as scrapers.

PAUL ZAKEL.

REFERENCES CITED

The following references are of record in the file of this patent:

UNITED STATES PATENTS

| Number | Name | Date |
|---|---|---|
| 2,179,532 | Walch | Nov. 14, 1939 |
| 2,317,511 | Barrett | Apr. 27, 1943 |
| 2,353,120 | Austin | July 11, 1944 |
| 2,396,287 | Robb | Mar. 12, 1946 |